United States Patent [19]
Amano

[11] Patent Number: 5,237,578
[45] Date of Patent: Aug. 17, 1993

[54] SOLID-STATE LASER DEVICE CAPABLE OF PRODUCING AN OUTGOING LASER BEAM HAVING A NARROWER SPECTRAL BAND WIDTH

[75] Inventor: Satoru Amano, Tokyo, Japan

[73] Assignee: Hoya Corporation, Tokyo, Japan

[21] Appl. No.: 786,386

[22] Filed: Nov. 1, 1991

[30] Foreign Application Priority Data

Nov. 5, 1990 [JP] Japan .................. 2-297207

[51] Int. Cl.$^5$ .............................. H01S 3/10
[52] U.S. Cl. ...................... 372/22; 372/21; 372/10
[58] Field of Search ............ 372/21, 22, 70, 71, 372/75, 11, 13

[56] References Cited

U.S. PATENT DOCUMENTS

| | | | |
|---|---|---|---|
| 4,884,277 | 11/1989 | Anthon et al. | 372/22 |
| 4,965,803 | 10/1990 | Esterowitz et al. | 372/13 |
| 5,070,505 | 12/1991 | Dixon | 372/99 |

OTHER PUBLICATIONS

Volosov, V. D. et al, "Accessory for doubling the frequency of laser radiation", Sov. J. Opt. Technol. 44(6), Jun. 1977, pp. 375–376.

Primary Examiner—James W. Davie
Attorney, Agent, or Firm—Ladas & Parry

[57] ABSTRACT

In a solid-state laser device for producing an outgoing laser beam having a waveband of near infrared radiation that is represented by a specific wavelength of, for example, 0.85 $\mu$m, the solid-state laser device comprises a semiconductor laser device for producing an excitation laser beam having an excitation wavelength of, for example, 806 nm. By the excitation laser beam, a first laser medium such as a self-frequency doubling crystal produces a first laser beam having a first wavelength of, for example, 0.5315 $\mu$m. The first wavelength is equal to a wavelength of a second harmonic of the first laser medium is shorter than the specific wavelength. Excited by the first laser beam, a second laser medium such as an Er:LiYF$_4$ crystal produces a second laser beam having a second wavelength equal to the specific wavelength. The solid-state laser device thereby produces the second laser beam as the outgoing laser beam. The solid-state laser device further comprises a nonlinear optical crystal for converting the outgoing laser beam into a converted laser beam having a wavelength of 0.425 $\mu$m. A Q-switching element may be disposed between the first and the second laser media. The self-frequency doubling crystal may be Nd$_x$Y$_{1-x}$Al$_3$(BO$_3$)$_4$ crystal.

4 Claims, 2 Drawing Sheets

SOLID-STATE LASER DEVICE CAPABLE OF PRODUCING AN OUTGOING LASER BEAM HAVING A NARROWER SPECTRAL BAND WIDTH

BACKGROUND OF THE INVENTION

This invention relates to a solid-state laser device and, more particularly, to a solid-state laser device producing, by using a semiconductor laser device as an excitation light source, an outgoing laser beam having a waveband represented by a specific wavelength of, for example, 0.85 micrometers.

In the prior art, a semiconductor laser device of GaAlAs type is used as a solid-state laser device producing an outgoing laser beam having a waveband represented by a specific wavelength of 0.85 micrometers. The semiconductor laser device comprises a resonator which is controlled by electrical current. The resonator has a resonator length which is variable in accordance with the temperature therearound. As a result, the semiconductor laser device produces the outgoing laser beam which has a wider spectral band width and which has the specific desired wavelength. In order to apply such a semiconductor laser device to optical communication and measurement for use in light, to the semiconductor laser device must be added a number of other functional parts such as a Peltier element for use in temperature compensation. In addition, while the semiconductor laser device is operable in a pulse oscillating operation, the semiconductor laser device is not operable in a Q-switching mode.

SUMMARY OF THE INVENTION

It is therefore an object of this invention to provide a solid-state laser device which is capable of producing an outgoing laser beam having a narrower spectral band width.

It is another object of this invention to provide a solid-state laser device of the type described, which can produce the outgoing laser beam with a high stable wavelength.

It is still another object of this invention to provide a solid-state laser device of the type described, which is operable in a Q-switching mode.

Other objects of this invention will become clear as the description proceeds.

On describing the gist of an aspect of this invention, it is understood that a solid-state laser device serves for producing an outgoing laser beam having a waveband of near infrared radiation that is represented by a specific wavelength.

According to the above-mentioned aspect of this invention, the above-understood solid-state laser device comprises the semiconductor laser device for producing an excitation laser beam. Excited by the excitation laser beam, a first laser medium produces a first laser beam having a first wavelength equal to the wavelength of a second harmonic thereof that is shorter than the specific wavelength. Excited by the first laser beam, a second laser medium produces a second laser beam having a second wavelength equal to the specific; wavelength. The solid-state laser device thereby produces the second laser beam as the outgoing laser beam.

The specific wavelength is equal, for example, to 0.85 micrometers.

Preferably, the first laser medium may comprise a self-frequency doubling crystal.

Preferably, the second laser medium may comprise an Er:LiYF$_4$ (that is, Yttrium Lithium Fluoride doped with Erbium ions) crystal.

The solid-state laser device may further comprise a Q-switching element which is disposed between the first laser medium and the second laser medium.

DESCRIPTION OF THE PREFERRED EMBODIMENTS

Figure 1:
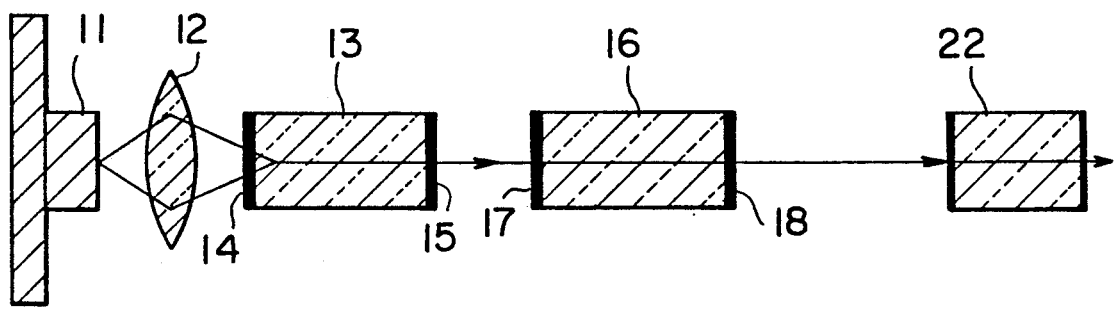
FIG. 1 is a schematic cross sectional view of a solid-state laser device according to a first embodiment of this invention.

Referring to FIG. 1, description will proceed with respect to a solid-state laser device according to a first embodiment of this invention. The solid-state laser device produces an outgoing laser beam which has an outgoing waveband of near infrared radiation. In the example being illustrated, the outgoing waveband is specified by a specific wavelength of 0.85 micrometers.

The solid-state laser device comprises a semiconductor laser device 11 for producing an excitation laser beam having an excitation waveband which is represented by an excitation wavelength. The semiconductor laser device 11 is used as an excitation light source. In the example being illustrated, the excitation laser beam has a excitation waveband between 802 nanometers and 810 nanometers. The semiconductor laser device 11 may be of broad area type SLD303WT, produced by SONY Corporation, which has a power of 500 mW and which has the excitation wavelength of 808 nanometers.

The excitation laser beam is condensed into a condensed laser beam by a condensing lens 12. The condensed laser beam is supplied to a first laser medium 13. The condensing lens 12 serves for condensing the excitation laser beam into the condensed laser beam onto the first laser medium 13 to effectively excite or pump the first laser medium 13 by the excitation laser beam. In the example being illustrated, the condensing lens 12 consists of only one convex lens. The condensing lens 12 may comprise a lens system which consists of a plurality of lenses.

In the example being illustrated, the first laser medium 13 comprises a self-frequency doubling crystal. The self-frequency doubling crystal may be an Nd$_x$Y$_{1-x}$Al$_3$(BO$_3$)$_4$ crystal including Nd whose x is equal to 0.04. Herein, the Nd$_x$Y$_{1-x}$Al$_3$(BO$_3$)$_4$ crystal will be called an NYAB crystal for the purpose of simplification. In this event, the self-frequency doubling crystal 13 has a maximum absorption wavelength which is equal to either 804 nanometers or 808 nanometers. The first laser medium, namely, the self-frequency doubling crystal 13 may have, for example, a rectangular parallelpiped shape which has, in size, a cross section having one side of 3 mm and which has a length of 5 mm. The self-frequency doubling crystal 13 is a negative uniaxial crystal which belongs to the point group R32 and is grouped into a trigonal system from the point of crystalline structure.

The self-frequency doubling crystal 13 is a crystal adopted to generate a laser beam having a primary wavelength of a fundamental harmonic of 1.063 nanometers and to convert the laser beam having the primary wavelength into another laser beam having a subsidiary wavelength of a second harmonic of 0.5315 nanometers. The laser beam having the subsidiary wavelength will be called a first laser beam having a first wavelength. In other words, the first wavelength is equal to the subsidiary wavelength of the second harmonic. The first wavelength is shorter than the specific wavelength.

The self-frequency doubling crystal 13 has an incoming end surface and an outgoing end surface each of which is polished with the incoming and the outgoing end surfaces opposed in parallel to each other.

The incoming end surface of the self-frequency doubling crystal 13 is supplied with the condensed laser beam from the condensing lens 12. The incoming end surface is coated with a first incoming film 14 as depicted as a heavy 20 solid line in FIG. 1. The first incoming film 14 sufficiently transmits the condensed laser beam having the excitation wavelength and sufficiently reflects the laser beams having the primary and the subsidiary wavelengths of the fundamental and the second harmonics. In the example being illustrated, the first incoming film 14 has a transmittance more than 95% for the excitation wavelength and has reflectances more than 99% and 80% for the primary and the subsidiary wavelengths of the fundamental and the second harmonics, respectively.

The outgoing end surface of the self-frequency doubling crystal 13 is coated with a first outgoing film 15. The first outgoing film 15 sufficiently reflects the laser beam having the primary wavelength of the fundamental harmonic and sufficiently transmits the laser beam having the subsidiary wavelength of the second harmonic. In the example being illustrated, the first outgoing film 15 has a reflectance more than 99% for the primary wavelength of the fundamental harmonic and has a transmittance more than 90% for the subsidiary wavelength of the second harmonic.

Under the circumstances, the self-frequency doubling crystal 13 generates, from its outgoing end surface, the first laser beam having the first wavelength of 0.5315 micrometers. At any rate, the first laser medium, namely, the self-frequency doubling crystal 13 produces the first laser beam having the first wavelength which is shorter than the specific wavelength.

The first laser beam is produced along an optical axis on which a second laser medium 16 is disposed. In the example being illustrated, the second laser medium 16 comprises an Er:LiYF$_4$ crystal. The expression Er:-LiYF$_4$ means Yttrium Lithium Fluoride doped with Eribium ions. Preferably, the Er:LiYF$_4$ crystal may include 5% Er by atomic weight. Herein, the Er:LiYF$_4$ crystal will be called an Er:YLF crystal for the purpose of simplification.

The second laser medium 16 has an incoming end surface and an outgoing end surface each of which is polished with the incoming and the outgoing end surfaces opposed in parallel each other.

The incoming end surface of the second laser medium 16 is coated with a second incoming film 17. The second incoming film 17 sufficiently transmits the first laser beam having the first wavelength and sufficiently reflects a second laser beam having a second wavelength equal to 0.85 micrometers. In the example being illustrated, the second incoming film 17 has a transmittance more than 99% for the first wavelength and a reflectance more than 99% for the second wavelength.

The outgoing end surface of the second laser medium 16 is coated with a second outgoing film 18. The second outgoing film 18 sufficiently reflects the first laser beam having the first wavelength and transmits the second laser beam having the second wavelength. In the example being illustrated, the second outgoing film 17 has a reflectance more than 99% for the first wavelength and has a transmittance of approximately 2.5% for the second wavelength.

Therefore, the second laser medium 16, which is excited or pumped by the first laser beam, produces the second laser beam having the second wavelength equal to the specific wavelength. As a result, the solid-state laser device produces the second laser beam as the outgoing laser beam.

In the self-frequency doubling crystal 13, an angular phase matching condition is given as follows. The self-frequency doubling crystal 13 is characterized by an effective nonlinear optical coefficient $d_{eff}$ in the angular phase matching condition of the type I which is given by:

$$d_{eff} = d_{11} \times \cos\theta_m \times \cos 3\phi,$$

where $\theta$ and $\phi$ represent angles in polar coordinates inclined to a Z-axis and an X-axis in the crystal, respectively. In addition, a phase matching angle $\theta_m$ is given by:

$$\sin^2\theta_m = \{[n_o(w)]^{-2} - [n_o(2w)]^{-2}\}/\{[n_e(2w)]^{-2} - [n_o(2w)]^{-2}\},$$

where $n_o(w)$, $n_o(2w)$, and $n_e(2w)$ represent refractive indexes of the NYAB crystal, respectively, and have values as follows:

$$n_o(w) = 1.7553,$$

$$n_o(2w) = 1.7808,$$

and $$n_e(2w) = 1.7075.$$

As a result, the phase matching angle $\theta_m$ has a value as follows:

$$\theta_m = 32°54'.$$

On the other hand, the angle $\phi$ satisfies the angular phase matching condition at three values, namely, 0°, 60°, and 120°. In general, 0° is used as the angle $\phi$.

In the example being illustrated, the second laser medium, namely, the Er:YLF crYstal 16 is a circular cylinder in shape which has a cross section 3 mm in diameter and a length of 5 mm.

Figure 2:
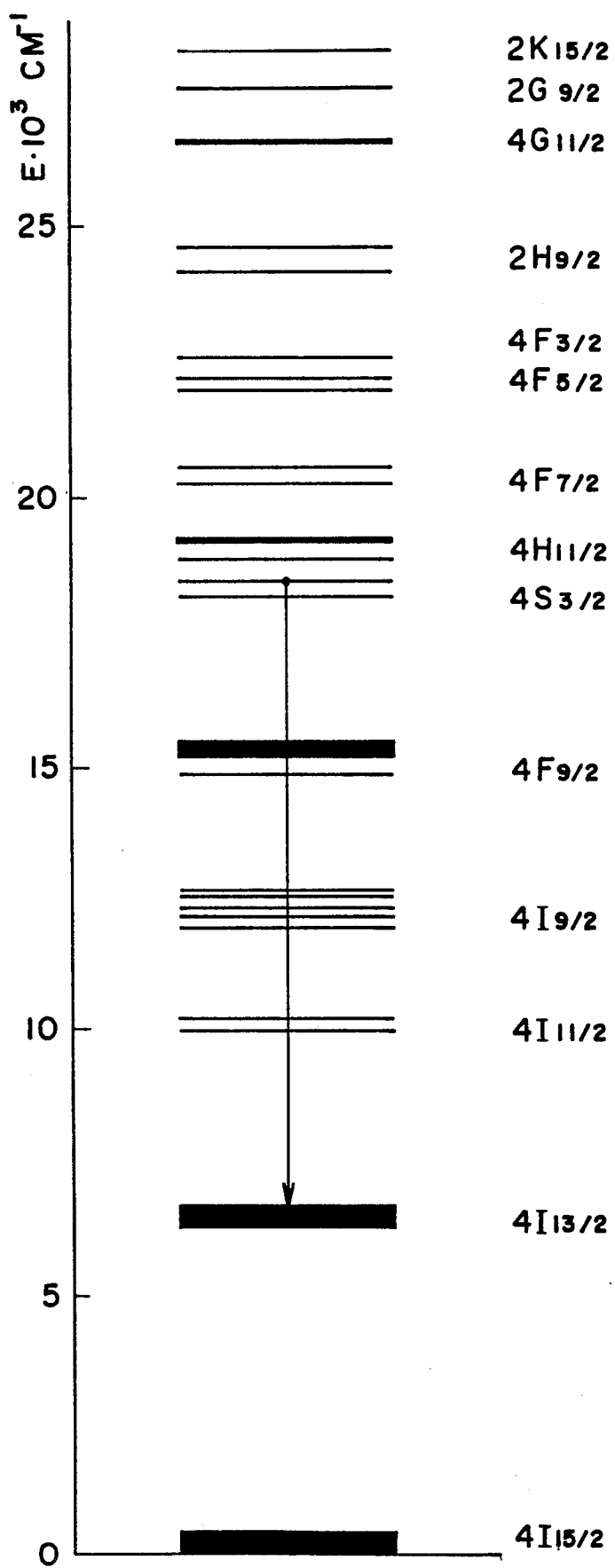
FIG. 2 is an energy level diagram of an Er:LiYF$_4$ crystal for use in the solid-state laser device illustrated in FIG. 1.

FIG. 2 illustrates energy levels of the Er:YLF crystal. In FIG. 2, the ordinate represents energy levels $(E \cdot 10^3 CM^{-1})$. A transition for Er ions of the wavelength of 0.85 micrometers is a transition from an energy level of $4S_{3/2}$ to another energy level of $4I_{13/2}$ as shown by the arrow at FIG. 2 and occurs in 4-level.

The first laser medium, namely, the self-frequency doubling crystal 13 generates the first laser beam of the first wavelength or 0.5315 micrometers which corresponds to a band of an energy level of $4H_{11/2}$ in the energy levels of Er ions shown in FIG. 2. By optical absorption in this band, the Er ions are raised from an energy level of $4H_{15/2}$ in a ground state thereof to the energy level of $4H_{11/2}$. Raised up to the energy level of $4H_{11/2}$, the Er ions are shifted down to the energy level of $4S_{3/2}$ by a lattice vibration and so on. Shifted down to the energy level of $4S_{3/2}$, the Er ions are shifted down to the energy level of $4I_{13/2}$ to radiate the second laser beam of the second wavelength equal to 0.85 micrometers. Subsequently, the Er ions are transmitted from the energy level of 4I13/2 to the energy level of $4I_{15/2}$ by the lattice vibration.

In the above-mentioned first embodiment, the solid-state laser device may comprise a condenser optical system which is disposed between the first laser medium or the self-frequency doubling crystal 13 and the second laser medium or the Er:YLF crystal 16.

Figure 3:
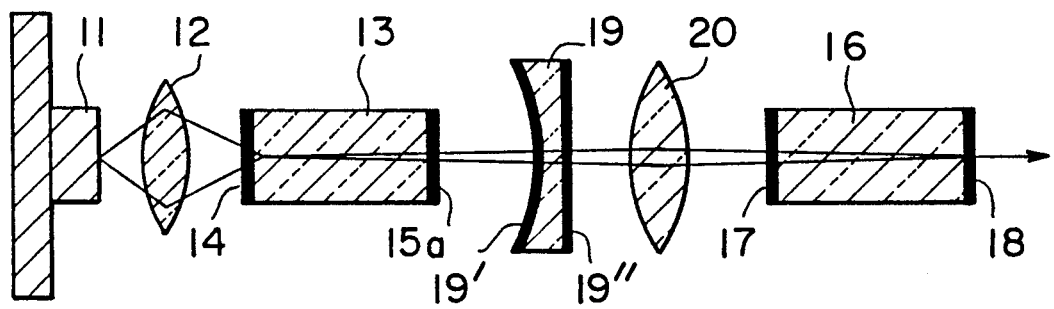
FIG. 3 is a schematic cross sectional view, like FIG. 1, of a solid-state laser device according to a second embodiment of this invention.

Referring to FIG. 3, a solid-state laser device according to a second embodiment of this invention is basically similar to that illustrated in FIG. 1 except that the solid-state laser device further comprises a mirror 19 and a convex lens 20 which are inserted between the first laser medium 13 and the second laser medium 16.

In the example being illustrated, the first laser medium, namely, the self-frequency doubling crystal 13 has the outgoing end surface which is coated with the first outgoing film 15a. The first outgoing film 15a sufficiently transmits the laser beams having the primary and the subsidiary wavelengths of the fundamental and the second harmonic in the self-frequency doubling crystal 13. In the example being illustrated, the first outgoing film 15a has a transmittance more than 95% for the primary and the subsidiary wavelengths for both of the fundamental and the second harmonics.

The mirror 19 has an incoming end surface which is coated with a third incoming film 19a. The third incoming film 19a has a reflectance more than 99% for the primary wavelength of the fundamental harmonic, namely, 1.063 micrometers and has a transmittance more than 90% for the subsidiary wavelength of the second harmonic, namely, 0.0.5315 micrometers. The mirror 19 has an outgoing end surface which is coated with a third outgoing film 19b. The third outgoing film 19b has a transmittance more than 99% for the first wavelength of 0.5315 micrometers.

The convex lens 20 serves for efficiently collecting or condensing the first laser beam having the first wavelength of 0.5315 micrometers on the second laser medium, namely, the Er:YLF crystal 16. In the example being illustrated, the convex lens 20 has a focal length of 10 mm.

In the above-mentioned second embodiment, the convex lens 20 may have both end surfaces coated with a film having a transmittance more than 99% for the first wavelength of 0.5315 micrometers.

Figure 4:
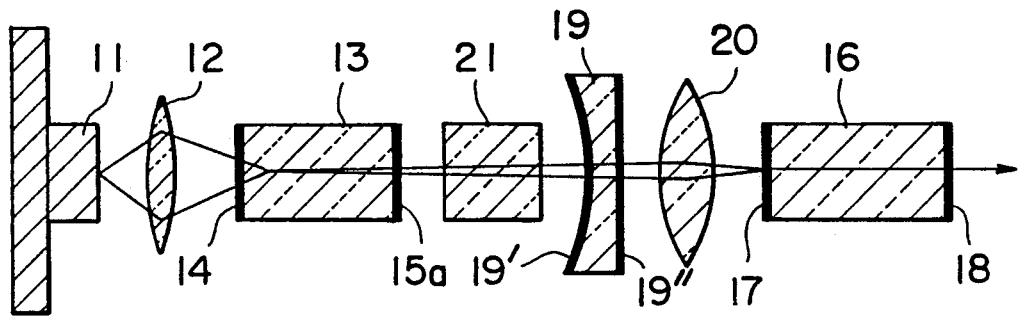
FIG. 4 is a schematic cross sectional view, like FIG. 1, of a solid-state laser device according to a third embodiment of this invention.

Referring to FIG. 4, a solid-state laser device according to a third embodiment of this invention is basically similar to that illustrated in FIG. 3 except that the solid-state laser device further comprises a Q-switching element 21 inserted between the first laser medium 13 and the mirror 19.

While the solid-state laser device according to each of the above-mentioned first and second embodiments carries out a laser oscillation for the wavelength of 0.85 micrometers in accordance with a continuous oscillation mode, the solid-state laser device according to the third embodiment carries out another laser oscillation in accordance with a Q-switching mode.

The Q-switching element 21 may be, for example, an acousto-optical medium, a plastic film containing coloring matter, an F-center laser crystal, or the like. The F-center laser crystal comprises an alkali halide crystal in which electrons are trapped by gamma rays, X-rays, an electron beam, and so forth. In the example being illustrated, the Q-switching element 21 comprises the acousto-optical medium. In addition, the acousto-optical medium consists of flint glass into which an ultrasonic wave is able to transmit by a transducer (not shown) such as an $LiNbO_3$, 36 Y-plate. The ultrasonic wave has an ultrasonic frequency of, for example, 80 MHz.

The acousto-optical medium, namely, the flint glass has incoming and outgoing end surfaces each of which is coated with a film having a transmittance more than 99% for the primary and the subsidiary wavelengths which are equal to 1.063 micrometers and 0.5315 micrometers, respectively.

In the solid-state laser device according to the third embodiment, the transducer, which transmits the ultrasonic wave into the flint glass, is driven by a driving circuit (not shown). The driving circuit supplies the transducer with an electric signal having a frequency of 80 MHz.

When the driving circuit is put into an ON state, primary diffracted light occurs in the acousto-optical medium by a Bragg diffraction effect which is well known in the art. The primary diffracted light is reflected by the mirror 19. Therefore, the first laser medium, namely, the self-frequency doubling crystal 13 is not operable as a resonator for the primary wavelength of its fundamental harmonic equal to 1.063 micrometers. As a result, the laser oscillation stops in the solid-state laser device.

On the other hand, the first laser medium, namely, the self-frequency doubling crystal 13 is operable as the resonator for the primary wavelength of its fundamental harmonic equal to 1.063 micrometers when the driving circuit is put into an OFF state. As a result, the solid-state laser device carries out the laser oscillation in accordance with the Q-switching mode. More specifically, the self-frequency doubling crystal 13 generates the first laser beam having the first wavelength of 0.5315 micrometers in accordance with the Q-switching mode. The first laser beam is collected or condensed on the second laser medium, namely, the Er:YLF crystal 15 by the convex lens 20. Accordingly, the solid-state laser device carries out the laser oscillation for the outgoing laser beam having the specific wavelength of 0.85 micrometers in accordance with the Q-switching mode.

With each of the above-mentioned first through third embodiments, the solid-state laser device produces the outgoing laser beam with the specific wavelength of 0.85 micrometers which is specified by, as oscillation spectra, spectra whose width is not greater than 0.1 nanometers. In addition, the solid-state laser device has stability for the wavelength of the order of $10^{-6}$. The solid-state laser device is operable in a special mode which consists of a single transverse mode of $TEM_{00}$ and multi longitudinal modes.

While this invention has thus far been described in conjunction with several preferred embodiments thereof, it will now readily be possible for those skilled in the art to develop various other embodiments of this invention. For example, each of the end surfaces of the first and the second laser media may be a concavity. The self-frequency doubling crystal 13 may be composed of the NYAB including Nd whose value of x is equal to a number except 0.04. The solid-state laser device may furthermore comprise a nonlinear optical crystal such as LBO which is adjacent to the outgoing surface of the Er:YLF crystal 16 and which is denoted by 22 on the right-hand side in FIG. 1. In this event, the nonlinear optical crystal 22 converts the outgoing laser beam having the specific wavelength of 0.85 micrometers into a converted laser beam having a converted wavelength of 0.425 micrometers.

In order to make the solid-state laser device operable in a single longitudinal mode, an etalon may be inserted in the solid-state laser device. In this event, the etalon may be disposed on the optical axis between the first laser medium 13 and the mirror 19 in the second embodiment illustrated in FIG. 3. On the other hand, in the third embodiment, the etalon may be disposed on the optical axis either between the first laser medium 13 and the Q-switching element 21 or between the Q-switching element 21 and the mirror 19.

The self-frequency doubling crystal 13 may be an Nd:LiNbO$_3$ crystal instead of the NYAB crystal. In the case where the electro-optic crystal is used as the Q-switching element 21, the electro-optic crystal may preferably be an LiNbO$_3$ crystal or a KDP crystal. In another case where the alkali halide crystal is used as the Q-switching element 21, the alkali halide crystal may preferably be an LiF crystal. Furthermore, the first laser medium 13 may be excited from a side surface thereof, in lieu of excitation of the first laser medium 13 from its end surface.

As mentioned before, according to this invention, it is possible to produce an outgoing laser beam which has a narrower spectral band width and has a high stable wavelength. This is because, the solid-state laser device comprises, as the laser medium, a solid-state laser medium. In addition, it is possible to make the width of oscillation spectra narrow. This is because, the solid-state laser device makes a first laser medium oscillate a first laser beam having a wavelength of a second harmonic thereof and supplies a second laser medium with the first laser beam as an excitation laser beam for the second laser medium.

What is claimed is:

1. A solid-state laser device for producing an outgoing laser beam having a waveband of near infrared radiation that is represented by a specific wavelength, said solid-state laser device comprising:

a semiconductor laser device for producing an excitation laser beam;

a self-frequency doubling crystal excited by said excitation laser beam for producing a first laser beam having a first wavelength equal to a wavelength of a second harmonic thereof that is shorter than said specific wavelength; and an Er:LiYF$_4$ crystal excited by said first laser beam for producing a second laser beam having a second wavelength equal to said specific wavelength, whereby said solid-state laser device produces said second laser beam as said outgoing laser beam.

2. A solid-state laser device as claimed in claim 1, wherein said specific wavelength is equal to 0.85 micrometers.

3. A solid-state laser device as claimed in claim 2, further comprising a nonlinear optical crystal supplied with said outgoing laser beam for converting said outgoing laser beam into a converted laser beam having a wavelength of 0.425 micrometers.

4. A solid-state laser device as claimed in claim 2, further comprising a Q-switching element which is disposed between said first laser medium and said second laser medium.

* * * * *